Figure 1:
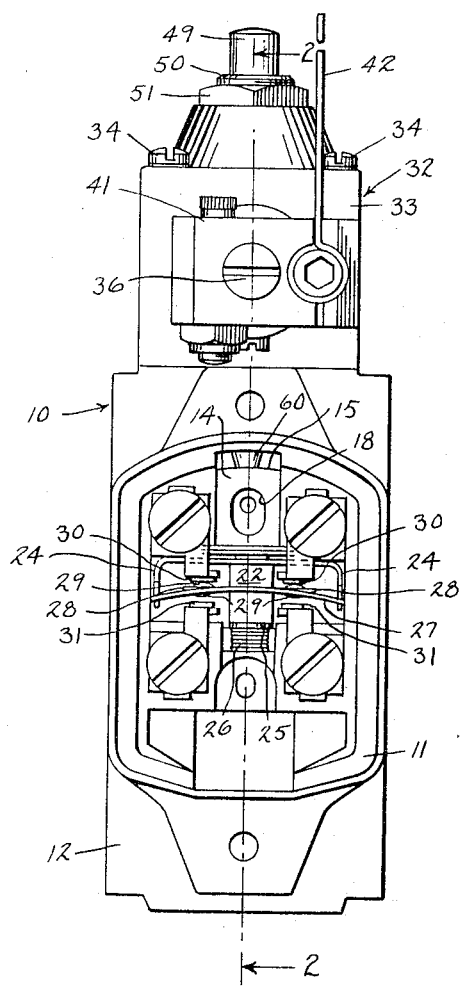

May 2, 1967  W. F. DEHN  3,317,687

MANUALLY RESETTABLE SWITCH ACTUATOR

Filed April 28, 1965  2 Sheets-Sheet 1

INVENTOR
WILLIAM F. DEHN

BY Thomas W. Ehrmann

ATTORNEY

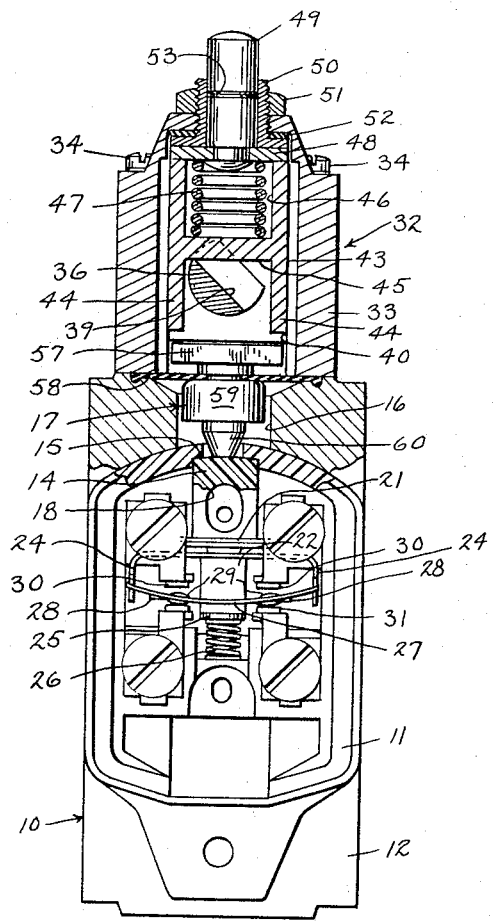

United States Patent Office 3,317,687
Patented May 2, 1967

3,317,687
MANUALLY RESETTABLE SWITCH ACTUATOR
William F. Dehn, Wauwatosa, Wis., assignor to Allen-Bradley Company, Milwaukee, Wis., a corporation of Wisconsin
Filed Apr. 28, 1965, Ser. No. 451,544
6 Claims. (Cl. 200—47)

This invention relates to an actuator for an electric switch, and more particularly to an actuator for a snap action electric switch that requires manual resetting of the actuator to return the switch to its normal position after having been tripped by external triggering of the actuator.

A switch of the snap action type is generally spring biased to one of two alternate contact positions. The function of an actuator for such a switch is to hold the switch in the other contact position until the actuator is triggered by an external force at which time the switch is permitted to return to its normal biased contact position. In present actuators, once the triggering force is removed the actuator will automatically return the switch to the alternate contact position and the switch is thereby automatically reset for the next tripping action. The combined actuator and switch may be employed as a limit switch to control the operation of a machine or structure.

While automatic resetting switch assemblies are suitable for a wide variety of controlling operations, there are situations in which it would be desirable that the actuator not automatically reset the switch. As one example, if the steps of a machining sequence are being controlled by a plurality of limit switches and the machining operations are halted by the tripping of one of the limit switches, it is not always possible thereafter to determine which of the limit switches have been tripped because the tripped limit switch may have been automatically reset. It would be most desirable in such an arrangement if the limit switch would not automatically reset even upon the momentary correction of the condition which caused its triggering. Then, it would be possible for the machine operator to determine from an examination of the limit switches themselves which step in the machine sequence was responsible for the malfunction. Another example of the desirable use of a limit switch which would not automatically reset may be found in machine control situations in which it was positively required that the machine operator take some corrective action before the machine could continue to operate after a malfunction. By the use of a switch assembly which was not automatically resettable but required manual resetting by the operator, it would require the operator to make the correction and to reset the switch.

Accordingly, it is one object of this invention to provide an actuator for a snap action switch which requires manual resetting after the switch has been triggered by the actuator, and in which the manual resetting is simply and effectively accomplished by a push button control.

In accordance with the invention an actuator is provided for a snap action switch of the type which includes a leaf spring carrying movable contacts and loaded at its ends to have the leaf spring capable of assuming two stable positions in each of which the movable contacts are in contact with alternate sets of spaced, fixed contacts. A biasing means normally urges structure that carries the leaf spring to one position. However, this is resisted by the leaf spring and by an actuator spring which operates on a trigger structure. When the actuator is triggered by an external force, the trigger structure removes the actuator spring force and the biasing means is sufficient to overcome the leaf spring so that the leaf spring will be shifted to its other stable position with a snap action. In this other stable position the movable contacts will be in contact with an alternate set of fixed contacts and the leaf spring will then combine with the switch spring to overpower the actuator spring even if the trigger mechanism returns to its untriggered position upon the removal of the external triggering force. However, a push button is provided on the actuator that is adapted to be manually pressed to assist the actuator spring to overcome the combined force of the biasing means and leaf spring and thereby cause the leaf spring to return to its other stable position and have the movable contacts contact the first set of fixed contacts.

The actuator spring is considerably weaker than that which has been heretofore provided in actuators. Prior actuators incorporated springs that were of sufficient capacity to overcome the force of both the leaf spring and the biasing means so that upon the release of the external triggering force, the switch would be automatically reset. As a consequence of the use of a relatively light spring in the actuator of this invention, a small force is all that is required to trigger the actuator.

It is another object of this invention to provide an actuator for a snap action switch which requires only a small triggering force and which can be used to control vibrations.

It is a further object of this invention to provide such an actuator which can function as an inertia control to be triggered by a sudden acceleration or deceleration of an object being controlled.

The foregoing and other objects and advantages of this invention will appear in the description which follows. In the description reference is made to the accompanying drawings which form a part hereof and in which there is shown an embodiment of the invention. The embodiment will be described in sufficient detail to enable those skilled in the art to practice the invention. It should be appreciated, however, that structural changes can be made in the embodiment described without departing from the scope of the invention. Accordingly, the description should not be taken in a limiting sense.

Figure 2:
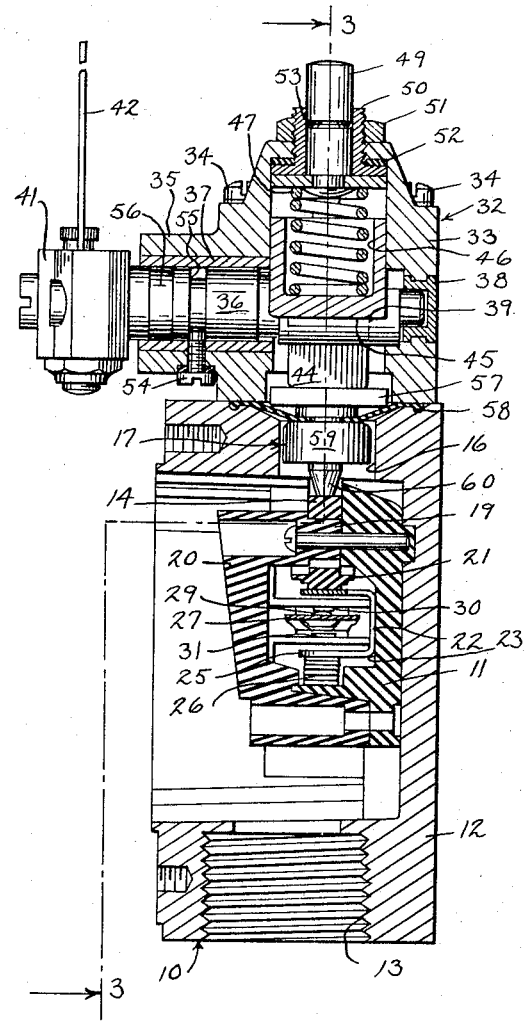

In the drawings:
FIG. 1 is a front view in elevation of a switch and an actuator in accordance with the present invention with parts of the switch removed for illustration of the internal workings of the switch contacts and showing the switch in an untripped condition;
FIG. 2 is a view in vertical section taken in the plane of the line 2—2 of FIG. 1; and
FIG. 3 is a front view in elevation of the switch and actuator of FIG. 1 showing the switch in a tripped condition and with the actuator and a portion of the switch in vertical section taken in the plane of the line 3—3 of FIG. 2.

Referring to the drawings, the actuator of this invention may be employed in conjunction with a snap action electric switch 10 of the type shown and described in U.S. Patent No. 2,791,656, issued May 7, 1957, to William F. Dehn and Roy E. Wilson, for "Contact Actuating Quick Action Switch." Only so much of the structure and operation of the switch 10 will be described as is necessary for an understanding of the present invention, and attention is drawn to U.S. Patent 2,791,656 for a full description of the switch.

An insulating molded housing 11 is suitably mounted in a cavity in a switch enclosure 12 the front face of which is open and normally closed by a cover plate which has been omitted from the drawings for clarity. The switch enclosure has a threaded bore 13 through its base to receive a wire conduit. A vertically movable slide 14 is received within the upper central portion of the housing 11. The slide 14 is provided with an upper face 15 exposed to an upper central bore 16 in the top of the switch enclosure 12 for engagement by a plunger 17 to be described in detail hereafter. The slide 14 is also provided with an elongated central slot 18 that receives a dowel portion 19 of a four-armed cover 20 that is fastened through the dowel portion 19 to the housing 11. At the lower end of the slide 14, there is provided a flange 21 that extends beyond the normal sides of the slide 14 and engages the top of a resilient carrier 22 disposed within a central cavity 23 of the housing 11.

The carrier 22 has depending supporting abutments 24 at each end and a spring seat 25 extending downwardly from the carrier 22 to retain the upper end of a biasing switch spring 26 held in place within a recess of the housing 11. The carrier 22 is normally urged upwardly to a position shown in FIG. 3 by the switch spring 26 and upward travel of the carrier 22 is limited by stops formed in the housing 11 and that engage the upper surface of the flange 21 of the plunger 14.

A thin resilient leaf spring 27 is inserted between the abutments 24 of the carrier 22. The leaf spring 27 is of a length slightly greater than the distance between the abutments 24 of the carrier 22. Upon inserting the leaf spring 27, the abutments 24 are deflected slightly outwardly and the resilient leaf spring 27 is placed under compression and stressed beyond the point where bending occurs to assume a bowed configuration. Portions of the leaf spring 27 are cut away to form a pair of movable contact blades 28. The movable contact blades 28 are formed as a unitary whole with the leaf spring 27 and each is deflectable at its free end which mounts a movable contact 29.

A pair of upper fixed contacts 30 are disposed above the leaf spring 27 and a pair of lower fixed contacts 31 are disposed below the leaf spring 27. Contact terminals are provided to mount each of the stationary contacts 30 and 31.

The cover 20 completes the enclosure for the contact structure as well as providing a guide by means of the dowel portion 19 for the upward and downward movement of the slide 14.

In the absence of force exerted on the top of the plunger 14, the leaf spring 27 will be bowed downwardly as shown in FIG. 3 under the urging of the switch spring 26 and the movable contacts 29 will bear against the lower fixed contacts 31 with the contact blades 28 deflected to provide contact force. When a downward force is applied to the top of the slide 14, the slide 14 and carrier 22 will be urged to a lower position shown in FIGS. 1 and 2 in opposition to the urging of the switch spring 26. In this position, the leaf spring 27 is bowed upwardly and the movable contacts 29 press upon the upper fixed contacts 30 with the contact blades 28 deflected to provide contact force.

The actuator 32 of this invention is provided to control the slide 14 and thereby to control the position of the movable contacts 29 relative to the stationary contacts 30 and 31. The actuator 32 includes a casing 33 secured to the top of the switch enclosure 12, and oriented in any one of four directions, by suitable means such as screws 34. One side of the casing 33 is provided with a projecting hub portion 35 and a horizontal shaft 36 is journaled in a bushing 37 in the hub portion 35 and a bearing 38 in an opposite wall of the casing 33. A portion of the shaft 36 is cut away to form a flat cam surface 39 that is aligned with a vertical well 40 formed in the casing 33. One end of the shaft 36 projects outwardly of the hub portion 35 and supports a mounting member 41 that holds a sensing finger 42 formed of stiff wire.

A follower 43 is disposed within the well 40 to be vertically reciprocated by the shaft 36 as the shaft is rotated. The follower 43 includes a pair of depending spaced legs 44 disposed on each side of the shaft 36 and a flat bottom follower surface 45. The upper portion of the follower 43 is formed as a cup 46 that receives an actuator spring 47 which bears at its upper end upon a washer 48 that is riveted to a push button 49. The push button 49 is journaled in a bushing 50 threadedly received in a threaded bore in the top of the casing 33 and projecting beyond the casing 33 and bushing 50. A nut 51 locks the bushing 50 in place and a flexible washer 52 is inserted between the bushing 50 and casing 33. A sealing ring 53 is disposed in a peripheral groove formed on the push button 49 and works against the interior of the bushing 50.

A removable set screw 54 is threadedly received through an opening in the hub portion 35 and bushing 37 and into a peripheral groove 55 in the shaft 36 to restrain the shaft 36 axially. A sealing ring 56 is disposed about the shaft 36 to seal with the interior periphery of the bushing 37.

The bottoms of the legs 44 of the follower 43 engage a square top of a plunger head 57 that loosely occupies a square bottom portion of the well 40. A threaded male projecting portion of the head 57 extends downwardly through the center of a circular rubber diaphragm 58 and thence through the top of an inverted cylindrical cup 59. Onto this threaded portion is screwed a female threaded plunger point 60 thereby clamping the diaphragm between the plunger head 57 and the plunger point 60. The outer edge of the diaphragm 58 is clamped between the lower surface of the casing 33 and the upper surface of the switch enclosure 12. The diaphragm assembly effectively seals off the escape of lubricant from the bottom of the well 40 yet permits downward motion of the follower 43 to be freely transmitted to the slide 14. That is, the follower 43 and the slide 14 with the plunger 17 therebetween can reciprocate vertically as a unit.

The operation of the actuator will now be described. Assume that the actuator and switch are in the untriggered position shown in FIGS. 1 and 2. That is, the shaft 36 would be so positioned as to have the flat cam surface 39 horizontal with the follower surface 45 of the follower 43 resting thereon. The depending legs 44 will then extend to their lowermost position to hold the plunger point 60 at its lowest position in which it bears against the top of the slide 14 and positions the carrier 22 in its lowermost position. With the carrier 22 in such position, the leaf spring 27 assumes an upwardly bowed condition in which the movable contacts 29 bear against the upper fixed contacts 30. Furthermore, in such position of the carrier 22 the switch spring 26 is compressed and the ends of the leaf spring 27 will react against the abutments 24 to exert a downward force on the carrier 22 opposing the force exerted on the carrier by the switch spring 26. The downward force exerted by the leaf spring 27 together with the downward force exerted by the actuator spring 47 acting through the follower 43, the plunger 17, and the slide 14 is sufficient to overcome the force of the switch spring 26 and the leaf spring 27 will therefore be retained in this stable position.

When an external triggering force is exerted on the sensing finger 42 sufficient to rotate such sensing finger 42 and the shaft 36 to which it is connected, the edges of the flat camming surface 39 will force the follower 43 upwardly against the force of the spring 47. The upward movement of the follower 43 removes the effect of the actuator spring 47 from the carrier 22 and the switch spring 26 is sufficiently powerful to overcome the downward forces exerted by the spring leaf 27 on the carrier 22. Therefore, the carrier 22 will be moved upwardly and the leaf 27 will snap over to its alternate stable position in which the leaf spring 27 is bowed downwardly with the movable contacts 29 resting against the lower fixed contacts 31. When the leaf spring 27 is in this alternate position the ends of the leaf spring 27 exert an upward force on the carrier 22 which will add to the force exerted by the switch spring 26. This combined upward force on the carrier 22 is greater than the force which can be exerted downwardly by the actuator spring 47 and, therefore, although the sensing finger 42 is returned to its vertical position after removal of the external triggering force, the actuator spring 47 is incapable of causing the switch to be reset.

Resetting of the switch can only be accomplished by depressing the push button 49 so that the normal force exerted in depressing the push button 49 when added with the force of the actuator spring 47 will be sufficient to overcome the combined force of the switch spring 26 and leaf spring 27. Then, the carrier 22 can be moved downwardly to cause the leaf spring 27 to snap over to its first stable position in which it is bowed upwardly and the movable contacts 29 bear against the upper fixed contacts 30.

From the foregoing description of the operation of the actuator, it will be seen that for proper operation the force capable of being exerted by the actuator spring 47 must be sufficient when added to the force exerted by the leaf spring 27 to overpower the switch spring 26 and yet must be less than that which would overpower the leaf spring 27 and the switch spring 26. Stated another way, the actuator spring 47 must be selected to exhibit a spring force greater than the difference in the forces exerted by the leaf spring 27 and the switch spring 26 and less than the total of the forces exerted by the leaf spring 27 and switch spring 26.

Because the spring 47 of the actuator is light compared with springs of prior actuating mechanism which caused automatic resetting of the tripped switch, the actuator is ideally adapted for use in control situations in which the external triggering force is slight.

The actuator can also be employed to control vibrations. That is, the switch and actuator can be mounted on a machine or structure subject to vibration to guard against excessive vibrations. To this end, a weight would be mounted on the sensing finger 42 to be oscillated by the vibrations and when the period of oscillation of the weighted sensing finger exceeds a predetermined amount sufficient to overcome the force of the spring 47 and permit the follower 43 to be raised the switch would trip. The period of oscillation of the weighted sensing finger and consequently the degree of vibration that will be tolerated can be varied by adjusting the position of the weight on the finger 42.

Furthermore, the actuator can function as an inertia control by being mounted on a structure susceptible to acceleration or deceleration, and sudden changes in acceleration or deceleration would cause the weighted sensing finger to be rotated to trip the switch.

The actuator has been described as including an externally actuable rotatable member in the form of the shaft 36. However, other externally actuable means could be employed to shift the follower 43 upon the application of an external force. For example, a lever arm could be used that could have its fulcrum in the hub portion 35 with one end engaging the follower 43 and its other end extending outwardly of the casing 33 for engagement by a triggering force.

Additionally, the push button 49 could be replaced by other reset means such as an air cylinder having its piston replacing the push button and operating on the actuator spring 47.

I claim:

1. An actuator for a switch having a carrier that is movable between extreme positions in which contacts carried by the carrier alternately engage with spaced fixed contacts, biasing means normally urging the carrier to one extreme position, and snap action spring means that exerts a force on the carrier that is additive of the force of the biasing means when the carrier is in said one position and subtractive of the force of the biasing means when the carrier is in the other position, said actuator comprising: a support; an externally actuable rotatable member mounted on said support; a follower slidably mounted on said support for reciprocation with respect thereto and adapted to operate on said carrier; a spring normally urging said follower to a first position in which said follower will hold said carrier in said other position of said carrier; means translating rotation of said rotatable member to reciprocation of said follower whereby external actuation of said rotatable member will move said follower to a second position and permit said biasing means to shift said carrier to said one position of said carrier; said spring being adapted to exert a force sufficient to combine with said spring means to overcome said biasing means to hold said carrier in said other position and insufficient to overcome said spring means and said biasing means to return said carrier to said other position from said one position; and a manually actuable means mounted on said support and adapted to be actuated to return said carrier to said other position.

2. An actuator for a switch having a carrier that is movable between extreme positions in which contacts carried by the carrier alternately engage with spaced fixed contacts, biasing means normally urging the carrier to one extreme position, snap action spring means that exerts a force on the carrier that is additive of the force of the biasing means when the carrier is in said one position and subtractive of the force of the biasing means when the carrier is in the other position, and a plunger guided for reciprocation in the switch and operable on the carrier, said actuator comprising: a housing adapted to be mounted on the switch; an externally actuable rotatable member journaled in said housing; a follower slidably mounted in said housing for linear reciprocation with respect thereto and adapted to engage said plunger; a spring normally urging said follower to a first linear position in which said follower will bear upon said plunger to hold said carrier in said other position of said carrier; means translating rotation of said rotatable member to reciprocation of said follower whereby external actuation of said rotatable member will move said follower to a second linear position that permits said biasing means to shift said carrier to said one position of said carrier; said spring being adapted to exert a force on said follower that is sufficient to combine with said spring means to overcome said biasing means to hold said carrier in said other position and insufficient to overcome said spring means and said biasing means to return said carrier to said other position from said one position; and a push button slidably supported in said housing and adapted when actuated to return said carrier to said other position.

3. An actuator in accordance with claim 2 wherein said push button extends through an opening in said housing aligned with the path of reciprocation of said follower, and said spring is biased between said follower and an inner end of said push button.

4. A manually resettable actuator for a switch having a carrier that is movable between extreme positions in which contacts carried by the carrier alternately engage with spaced fixed contacts, biasing means normally urging the carrier to one extreme position, a snap action leaf spring that exerts a force on the carrier that is additive of the force of the biasing means when the carrier is in said one position and subtractive of the force of the biasing means when the carrier is in the other position, and a plunger guided for reciprocation in the switch and operable on the carrier; said actuator comprising: a housing; an externally actuable rotatable shaft journaled in said housing; a follower slidably mounted in said housing for linear reciprocation in a path normal to the axis of said shaft, said follower having a flat follower surface and said shaft having a recess that defines a flat cam surface; an actuator spring in said housing normally urging said follower to a first position in which said follower surface engages said cam surface and said follower is adapted to engage said plunger to hold said carrier in said other position of said carrier, said actuator spring exerting sufficient force to maintain said carrier in said other position with the aid of said leaf spring and against the urging of said biasing means, said follower being shifted to a second position by engagement of the edges of said cam surface with said follower surface upon rotation of said shaft to thereby free said plunger and permit said carrier to be moved by said biasing means to said one position, said actuator spring exerting insufficient force to overcome the combined force of said leaf spring and biasing means to return said carrier to said one position after external actuation of said shaft; and manually actuable means operable on said follower to exert a force on said follower when actuated to have said plunger return said carrier to said other position.

5. A manually resettable actuator for a snap action switch having a carrier guided for reciprocation between first and second positions, a bowed resilient leaf spring carried at its ends by said carrier with said bow being substantially normal to the path of said carrier, movable contacts on said leaf spring, spaced fixed contacts disposed on each side of said leaf spring with which said movable contacts alternately close and to provide reaction members against which said movable contacts may be pressed, said carrier in moving from one position to the other pressing said movable contacts against said fixed contacts to one side thereof to initiate a snap over of said leaf spring into an oppositely bowed condition, biasing means normally urging said carrier to said first position, said leaf spring reacting upon said carrier with a force less than that of said biasing means to oppose said biasing means when said carrier is in said second position and assisting said biasing means when said carrier is in said first position, and a plunger guided for reciprocation to operate upon said carrier, said actuator comprising: a housing adapted to be mounted on the switch; a follower slidably mounted in said housing for linear reciprocation, said follower having a flat follower surface and a pair of spaced legs that depend from opposite sides of said follower surface to engage said plunger; a push button extending through an opening in said housing aligned with the path of reciprocation of said follower; an actuator spring biased between said follower and an inner end of said push button; a rotatable shaft journaled in said housing and projecting from said housing, said shaft extending between said legs with its axis normal to the path of said follower and being provided with a recess that defines a flat cam surface; and externally actuable means mounted on said projecting shaft to rotate the same when actuated; said actuator spring urging said follower to one position in which said follower surface engages said cam surface and said follower bears against said plunger to hold said carrier in said second position, said follower being shifted to another position by engagement of the edges of said cam surface with said follower surface upon rotation of said shaft to remove the force of said actuator spring from said plunger and permit said biasing means to move said carrier to said first position, said actuator exerting sufficient force to maintain said carrier in said second position with the aid of said leaf spring and against the urging of said biasing means but exerting insufficient force to overcome both said leaf spring and said biasing means to return said carrier to said second position from said first position, and said push button being manually depressible to assist said actuator spring to return said carrier to said second position.

6. An actuator for a switch having a carrier that is movable between extreme positions in which contacts carried by the carrier alternately engage with spaced fixed contacts, biasing means normally urging the carrier to one extreme position, and snap action spring means that exerts a force on the carrier that is additive of the force of the biasing means when the carrier is in said one position and subtractive of the force of the biasing means when the carrier is in the other position, said actuator comprising: a support; a follower slidably mounted on said support for reciprocation with respect thereto and adapted to operate on said carrier; a spring normally urging said follower to a first position in which said follower will hold said carrier in said other position of said carrier; externally actuable means on said support and engageable with said follower, said externally actuable means adapted upon external actuation to move said follower to a second position whereby said biasing means can shift said carrier to said one position of said carrier; said spring being adapted to exert a force sufficient to combine with said spring means to overcome said biasing means to hold said carrier in said other position and insufficient to overcome said spring means and said biasing means to return said carrier to said other position from said one position; and actuable reset means on said support and adapted when actuated to return said carrier to said other position.

References Cited by the Examiner
UNITED STATES PATENTS

| | | | |
|---|---|---|---|
| 2,412,119 | 12/1946 | Bently | 200—76 |
| 2,598,856 | 6/1952 | Swan et al. | 200—76 |
| 2,841,661 | 6/1958 | Wintle | 200—76 |
| 3,252,345 | 5/1966 | Russell | 200—47 X |

ROBERT K. SCHAEFER, *Primary Examiner.*

H. HOHAUSER, *Assistant Examiner.*